United States Patent
Farschi et al.

(10) Patent No.: US 12,402,607 B2
(45) Date of Patent: Sep. 2, 2025

(54) INCUBATOR TRAY AND A METHOD OF INCUBATING

(71) Applicant: Ovo Incubators (Pty) Ltd, Johannesburg (ZA)

(72) Inventors: Amir Farschi, Johannesburg (ZA); Rean Bootsma, Sinoville (ZA)

(73) Assignee: Ovo Incubators (Pty) Ltd, Johannesburg (ZA)

( * ) Notice: Subject to any disclaimer, the term of this patent is extended or adjusted under 35 U.S.C. 154(b) by 3 days.

(21) Appl. No.: 18/560,841

(22) PCT Filed: May 18, 2022

(86) PCT No.: PCT/ZA2022/050021
§ 371 (c)(1),
(2) Date: Nov. 15, 2023

(87) PCT Pub. No.: WO2022/246482
PCT Pub. Date: Nov. 24, 2022

(65) Prior Publication Data
US 2024/0268358 A1    Aug. 15, 2024

(30) Foreign Application Priority Data
May 21, 2021 (ZA) .................. 2021/03448

(51) Int. Cl.
*A01K 41/02* (2006.01)
*A01K 43/00* (2006.01)

(52) U.S. Cl.
CPC .......... *A01K 41/023* (2013.01); *A01K 41/026* (2013.01); *A01K 43/00* (2013.01)

(58) Field of Classification Search
CPC .... A01K 41/00; A01K 41/026; A01K 41/023; A01K 41/02
See application file for complete search history.

(56) References Cited

U.S. PATENT DOCUMENTS

| | | | |
|---|---|---|---|
| 3,556,731 A | 1/1971 | Martin | |
| 4,195,131 A | 3/1980 | Papas | |

(Continued)

FOREIGN PATENT DOCUMENTS

| | | |
|---|---|---|
| CN | 203372630 U | 1/2014 |
| EP | 1266691 A1 | 12/2002 |

(Continued)

OTHER PUBLICATIONS

"International Search Report", issued in PCT Application No. PCT/ZA2022/050021, Sep. 7, 2022.

(Continued)

*Primary Examiner* — Joshua J Michener
*Assistant Examiner* — Aaron M Rodziwicz
(74) *Attorney, Agent, or Firm* — Billion & Armitage

(57) ABSTRACT

An incubator tray includes a body that defines: (i) a first surface and a second surface that defines a sealed void therebetween; (ii) an inlet that permits inflow of fluid into the void defined between the first and second surfaces of the body; (iii) an outlet that permits outflow of fluid from the void defined between the first and second surfaces of the body; (iv) a plurality of bores that extend between the first and second surfaces, through the void defined between the first and second surfaces; and (v) a temperature sensor associated with each bore.

16 Claims, 6 Drawing Sheets

(56) References Cited

U.S. PATENT DOCUMENTS

| | | |
|---|---|---|
| 4,256,697 A | 3/1981 | Baldwin |
| 4,501,719 A | 2/1985 | Williams |
| 4,735,778 A | 4/1988 | Maruyama et al. |
| 4,824,791 A | 4/1989 | Ekholm et al. |
| 4,950,608 A | 8/1990 | Kishimoto |
| 5,435,378 A | 7/1995 | Heine et al. |
| 5,475,610 A | 12/1995 | Atwood et al. |
| 5,484,015 A | 1/1996 | Kyees |
| 5,504,007 A | 4/1996 | Haynes |
| 6,558,947 B1 | 5/2003 | Lund et al. |
| 2006/0199261 A1 | 9/2006 | Malmqvist et al. |
| 2014/0273182 A1 | 9/2014 | Tan et al. |
| 2015/0075440 A1 | 3/2015 | Aangenendt |
| 2015/0352553 A1 | 12/2015 | Beer et al. |
| 2016/0053088 A1 | 2/2016 | Dave et al. |
| 2018/0235185 A1 | 8/2018 | Meter |

FOREIGN PATENT DOCUMENTS

| | | | |
|---|---|---|---|
| WO | 0125866 A1 | 4/2001 | |
| WO | 2005097325 A1 | 10/2005 | |
| WO | WO-2006054867 A1 * | 5/2006 | ............ A01K 41/00 |
| WO | 2016053088 A1 | 4/2016 | |
| WO | WO-2019213659 A1 * | 11/2019 | ............ A01K 41/04 |

OTHER PUBLICATIONS

"Written Opinion of International Searching Authority", issued in PCT Application No. PCT/ZA2022/050021, Sep. 7, 2022.

\* cited by examiner

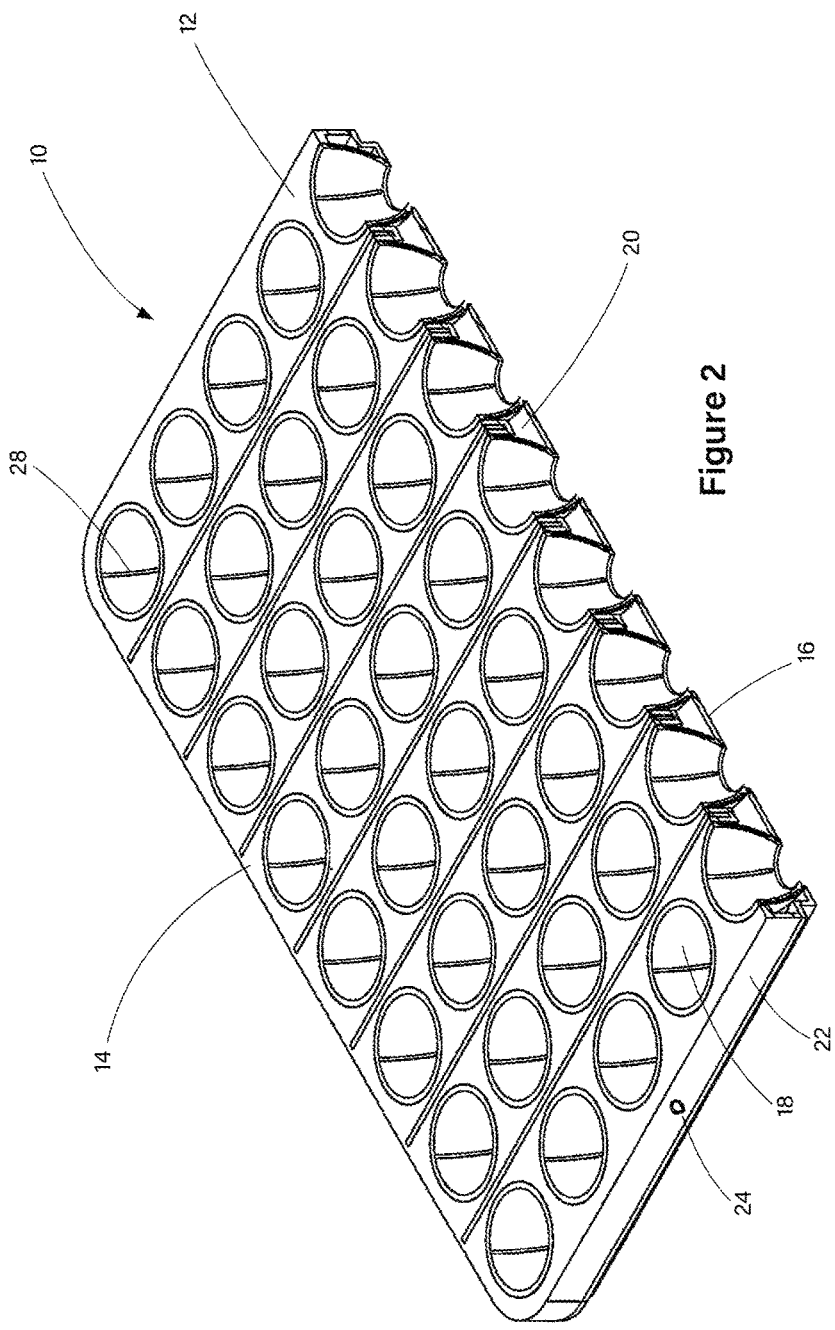
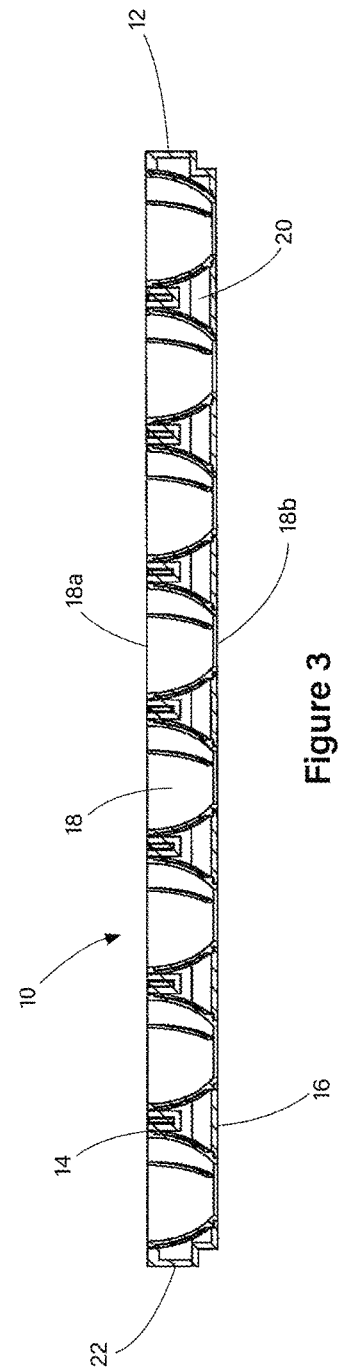

INCUBATOR TRAY AND A METHOD OF INCUBATING

BACKGROUND

The present invention relates to an incubator tray. More specifically, the present invention relates to a tray with bores/receptacles for receiving eggs and sensors for regulating incubation of the eggs. Furthermore, the present invention relates to a method of incubating eggs using an incubator tray with multiple sensors.

Incubator trays that:
define receptacles for receiving material/objects;
are hollow; and
facilitate circulation of temperature-controlled fluid within the trays to maintain material/objects supported on the trays at a constant temperature,
are known. Such trays are described in EP1,266,691 "Temperature-controlled device and method suitable for spectroscopic analysis", WO01/25866 "A system for controlling laboratory sample temperature and a thermal tray for use in such system", WO2005/097325 "Autonomous device with active temperature regulation", U.S. Pat. No. 3,556,731 "Automated incubation apparatus", U.S. Pat. No. 4,195,131 "Environmentally controlled unit", U.S. Pat. No. 4,256,697 "Blood incubator device", U.S. Pat. No. 4,501,719 "Tray apparatus for freeze-drying biologicals having a predetermined unit dosage", U.S. Pat. No. 4,735,778 "Microtiter plate", U.S. Pat. No. 4,824,791 "Thermostated cuvette set", U.S. Pat. No. 4,950,608 "Temperature regulating container", U.S. Pat. No. 5,435,378 "Apparatus for accurately heating and cooling articles", U.S. Pat. No. 5,475,610 "Thermal cycler for automatic performance of the polymerase chain reaction with close temperature control", U.S. Pat. No. 5,484,015 "Cold plate and method of making same", U.S. Pat. No. 5,504,007 "Rapid thermal cycle apparatus", U.S. Pat. No. 6,558,947 "Thermal cycler", US2006/0199261 "Holder and method for cooling or heating samples", US2014/0273182 "Device for carrying out chemical or biological reactions" and US2015/0352553 "Methods and compositions for rapid thermal cycling".

However, prior art incubator trays do not:
provide for ventilation around the material/objects received within the receptacles. More particularly, prior art incubators do not (in use) induce flow of air around material/objects received within the receptacles through venturi effect; or
ensure close proximity of the sensors on the tray to the material/objects received within the receptacles.

It is an object of this invention to address these drawbacks primarily by providing:
sensors on protrusions within the receptacles; and
modifying the receptacles to form bores that, in use, define open opposed axial ends with varying cross-sectional surface areas, thereby to induce a pressure differential along each bore (i.e. across the tray) when air flows along the tray.

SUMMARY OF THE INVENTION

According to a preferred embodiment of a first aspect of the invention, there is provided an incubator tray that includes a body that defines:
a first surface and a second surface that defines a sealed void therebetween; an inlet that, in use, permits inflow of fluid into the void defined between the first and second surfaces of the body;
an outlet that, in use, permits outflow of fluid from the void defined between the first and second surfaces of the body;
a plurality of bores that extend between the first and second surfaces, through the void defined between the first and second surfaces, wherein:
each bore is open at both axial ends; and
a first axial end of the bore proximal the first surface is larger in cross-sectional area than the cross-sectional area of a second axial end of the bore proximal the second surface; and
a temperature sensor associated with each bore,
such that, in use, an object to be incubated that is:
undersized relative to the cross-sectional area of the first axial end of a bore; and
oversized relative to the cross-sectional area of the second axial end of the bore,
may be supported on the body, within a bore, with the open axial ends of the bore permitting ventilation through the bore, past the object.

Typically, in respect of each bore, the body defines at least three protrusions that are spaced from each other and that protrude radially into the bore, such that, in use, an object supported on the body, within the bore, is supported on the protrusions associated with the bore.

Generally, each protrusion extends at least partially along the bore, from the first surface to the second surface.

Preferably, in respect of each bore, the temperature sensor is disposed on a protrusion.

Typically, the incubator tray further includes:
a heart rate sensor;
a movement sensor; and
a carbon dioxide sensor; and
a sonic, magnetic, electrostatic or electromagnetic transmitter for transmitting waves to an object supported on the body, within a bore,
associated with each bore.

Generally, in respect of each bore, the heart rate sensor, movement sensor and carbon dioxide sensor are disposed within a protrusion.

A heating element may be associated with each bore, which heating element is controlled by the temperature sensor associated with the associated bore.

Preferably, the heating element comprises a flexible circuit including a plurality of resistors.

Typically, the flexible circuit is in the form of a loop that extends about the radial perimeter of the bore.

Generally, the incubator tray further includes a processor that is in communication with each flexible circuit within the tray.

Preferably, an egg is supported within each bore and a blanket is laid over the eggs.

Typically, the incubator tray further includes a diffuser associated with each of the inlet and the outlet to diffuse fluid that is entering and exiting the void defined between the first and second surfaces of the body.

Generally, the incubator tray further includes a cover that covers: the first surface of the body, the bore and the flexible circuits.

According to a second aspect of the invention, there is provided a method of incubating eggs on an incubator tray according to the first aspect of the invention, which method includes the steps of:
orienting the incubator tray with the first surface of the body operatively above the second surface of the body;
supporting an egg on the incubator tray, within a bore;
passing air over the first and second surfaces of the body;

regulating the temperature of the incubator tray by:
monitoring the temperature of the egg using the temperature sensor; and
adjusting the flow of fluid within the void defined between the first and second surfaces of the body via the inlet and outlet;
monitoring:
the temperature of the egg using the temperature sensor;
the heart rate within the egg using the heart rate sensor;
movement within the egg using the movement sensor; and
the carbon dioxide level proximal the surface of the egg using the carbon dioxide sensor; and
in respect of each egg, triggering an event should any two or more of the following conditions be met:
the temperature sensor senses the egg temperature outside of a predetermined temperature range;
the heart rate sensor senses a heart rate within the egg outside of a predetermined heart rate range; and
the movement sensor senses movement within the egg outside of a predetermined range of activity level.

Typically, the method of incubating eggs further includes the step of passing air over the first surface of the body.

Generally, the trigger event includes one or more of:
communicating an alert that the embryo within the egg is dead;
ceasing electricity supply to sensors associated with the egg;
varying the temperature of the incubator tray;
varying airflow over the first surface of the body; and
varying the power output of the heating element associated with the bore in which the egg is supported.

BRIEF DESCRIPTION OF THE DRAWINGS

The invention will now be described in more detail, by way of example only, with reference to the accompanying drawings in which:

FIG. 2 is a cut-away perspective view of the incubator tray in FIG. 1 along line A-A;

FIG. 3 is a cross-sectional side view of the incubator tray in FIG. 1 along line A-A;

DESCRIPTION OF THE INVENTION

Figure 1:
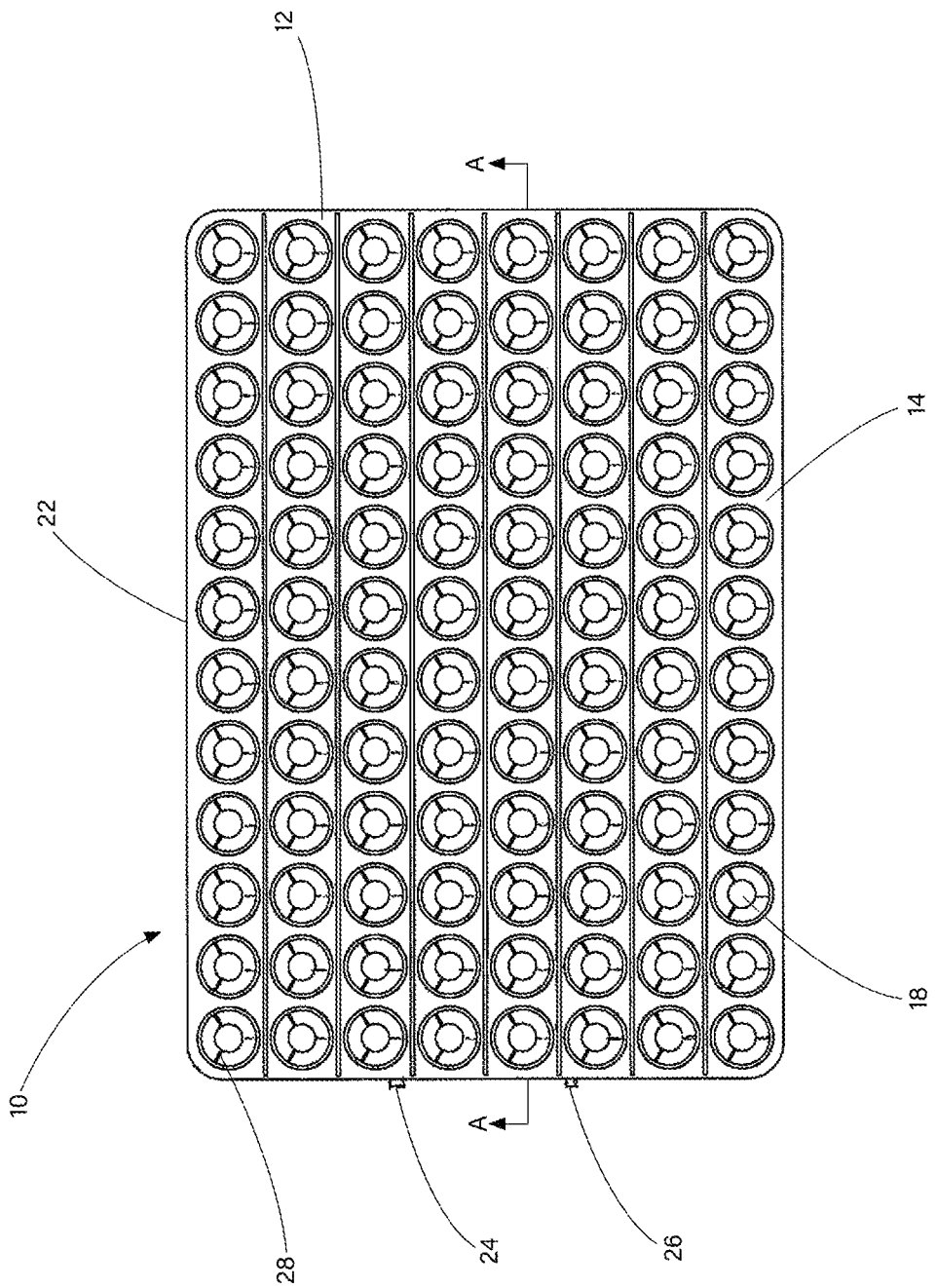
FIG. 1 is a top view of an incubator tray according to a first embodiment of the invention.
Figure 4:
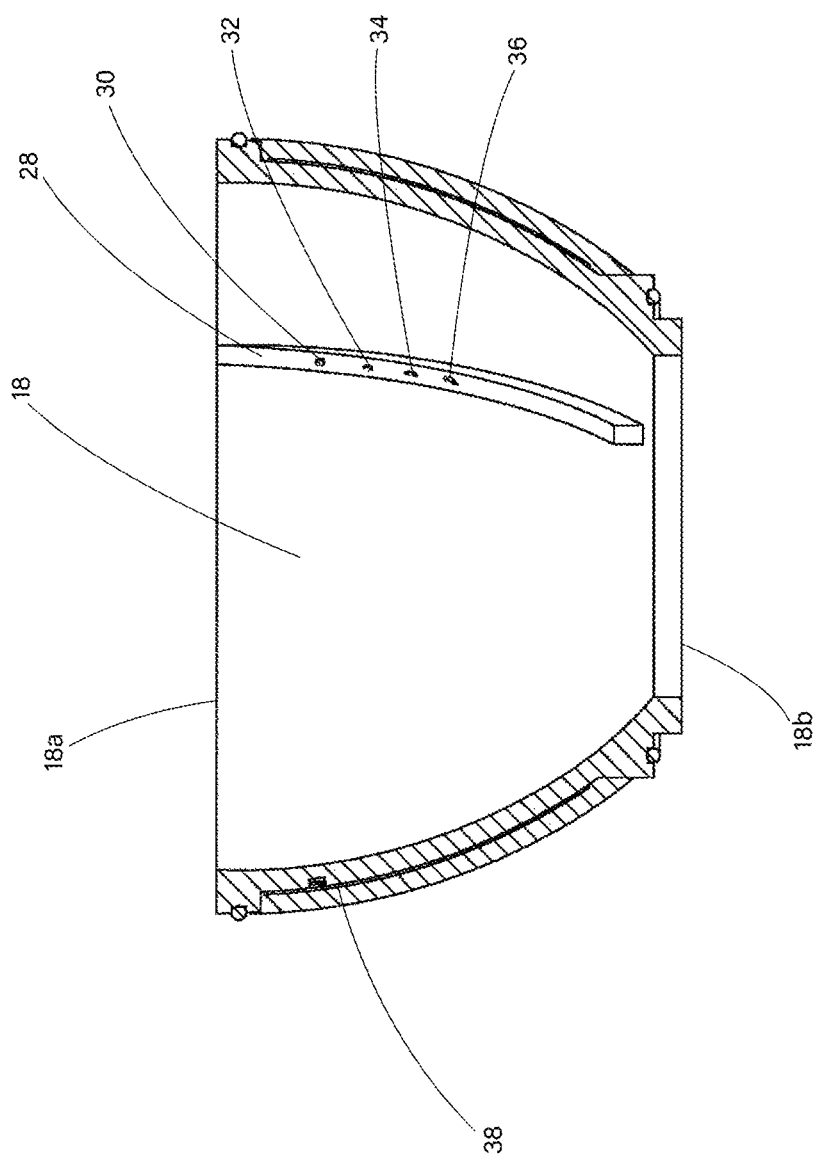
FIG. 4 is a cross-sectional side view of a bore defined by the incubator tray in FIG. 1.

With reference to FIGS. 1 to 4 of the drawings, a first embodiment of an incubator tray 10 comprises a body 12 that defines a first surface 14 and a second surface 16 and a plurality of bores 18 extending between the first and second surface 14 and 16.

The first and second surfaces 14 and 16 are generally planar. Importantly, the first and second surfaces 14 and 16 are:
spaced from each other; and
sealably connected to each other about their peripheral edge 22 and about the bores 18,
to form a sealed void 20 between the first and second surfaces 14 and 16.

An inlet 24 permits inflow of temperature-regulated fluid into the void 20 defined between the first and second surfaces 14 and 16 of the body 12, and an outlet 26 permits outflow of fluid from the void 20 defined between the first and second surfaces 14 and 16 of the body 12.

Each bore 18 extend between the first and second surfaces 14 and 16, through the void 20 defined between the first and second surfaces 14 and 16. Turning to FIG. 3, it will be appreciated that each bore 18 is open at both axial ends, albeit that a first axial end 18a of the bore 18 proximal the first surface 14 is larger in cross-sectional area than the cross-sectional area of a second axial end 18b of the bore 18 proximal the second surface 16.

The cross-sectional area of the first axial end 18a of the bore 18 is oversized relative to an object (such as an egg) (not shown) to be supported on the body 12, within the bore 18, whereas the cross-sectional area of the second axial end 18b of the bore 18 is undersized relative to such object.

In respect of each bore 18, the body 12 defines at least three protrusions 28 that are spaced from each other and that protrude radially into the bore 18. In use, an object supported on the body 12, within the bore 18, is supported on the protrusions 28 associated with the bore 18 in a similar way that a tripod supports an object. FIGS. 1 to 4 show each protrusion 28 extending along its associated bore 18 from the first surface 14 of the body 12 to the second surface 16 of the body 12. It will be appreciated that each protrusion 28 may extend along only a portion of the associated bore 18.

Furthermore, the set of three protrusions 28 associated with each bore 18, in use, space an object supported within the bore 18 from the radial wall of the bore 18, providing an annular gap (preferably, 3 mm in width) therebetween to facilitate ventilation through the bore 18, past the object. This annular gap also permits radiation of heat from the body 12 to the object supported within the bore 18.

A temperature sensor 30, a heart rate sensor 32, a movement sensor 34 and a carbon dioxide sensor 36 are associated with each bore 18, disposed on a protrusion 28 extending along the bore 18. Disposing the sensors 30, 32, 34 and 36 on the protrusions 28 ensures that the sensors 30, 32, 34 and 36 are in close contact with/proximity to objects supported on the body 12, within the bores 18. Alternatively, the heart rate sensor 32, movement sensor 34 and carbon dioxide sensor 36 may be disposed within a protrusion 28.

Better to regulate the temperature objects supported on the body 12, within the bores 18, a heating element 38 is associated with each bore, which heating element 38 is regulated by the temperature sensor 30.

Optionally, the body 12 further defines a deflector (not shown) associated with each bore 18, which deflector protrudes from one of the first or second surfaces 14 and 16 to divert air that, in use, flows along the first or second surface 14 and 16 through the bore 18.

Further optionally, a porous blanket (not shown) may, in use, be laid over the tray 12 (with objects supported on the body 12, within the bores 18).

Figure 5:
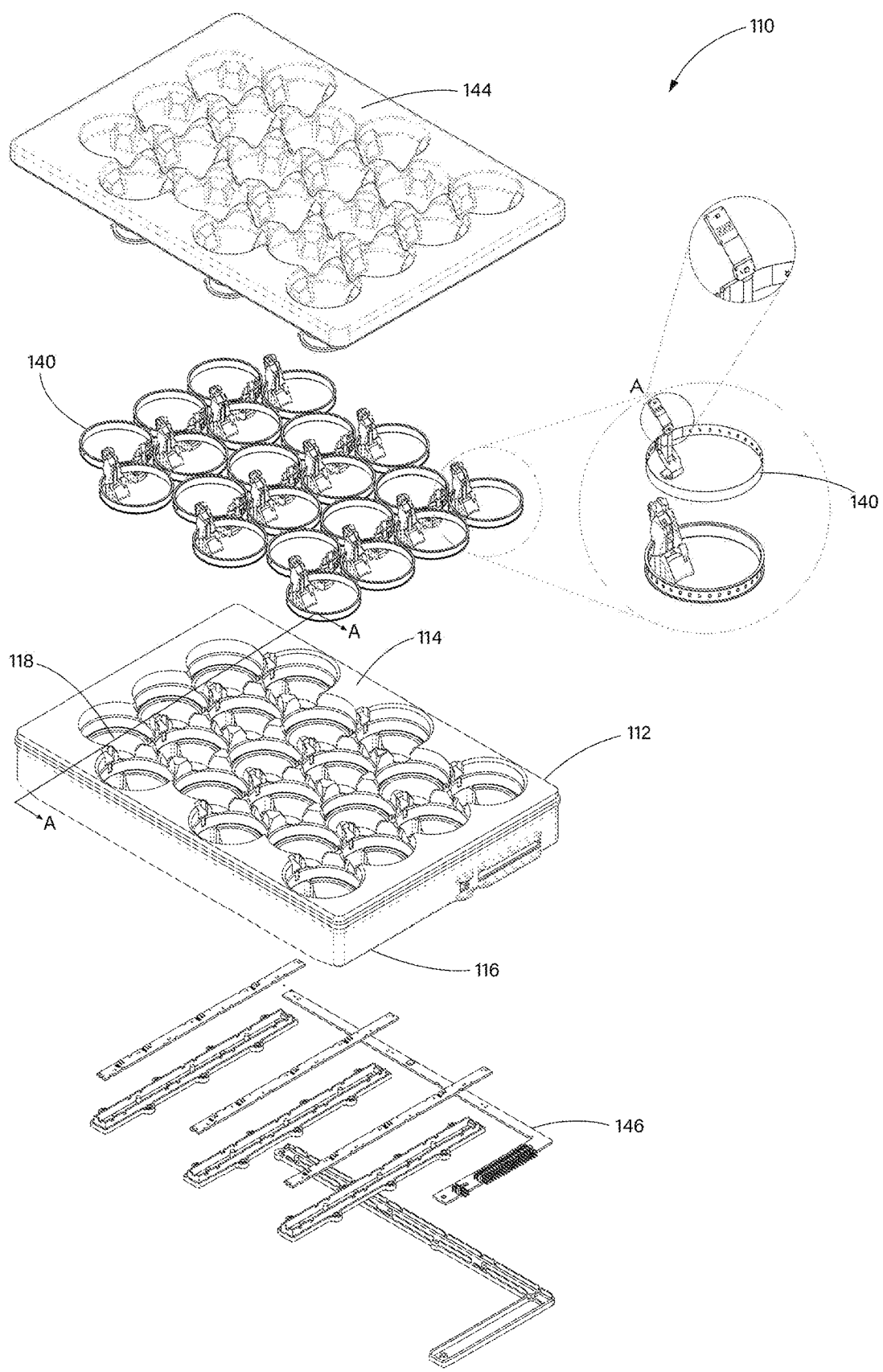
FIG. 5 is an exploded perspective view of an incubator tray according to an alternative embodiment of the invention.
Figure 6:
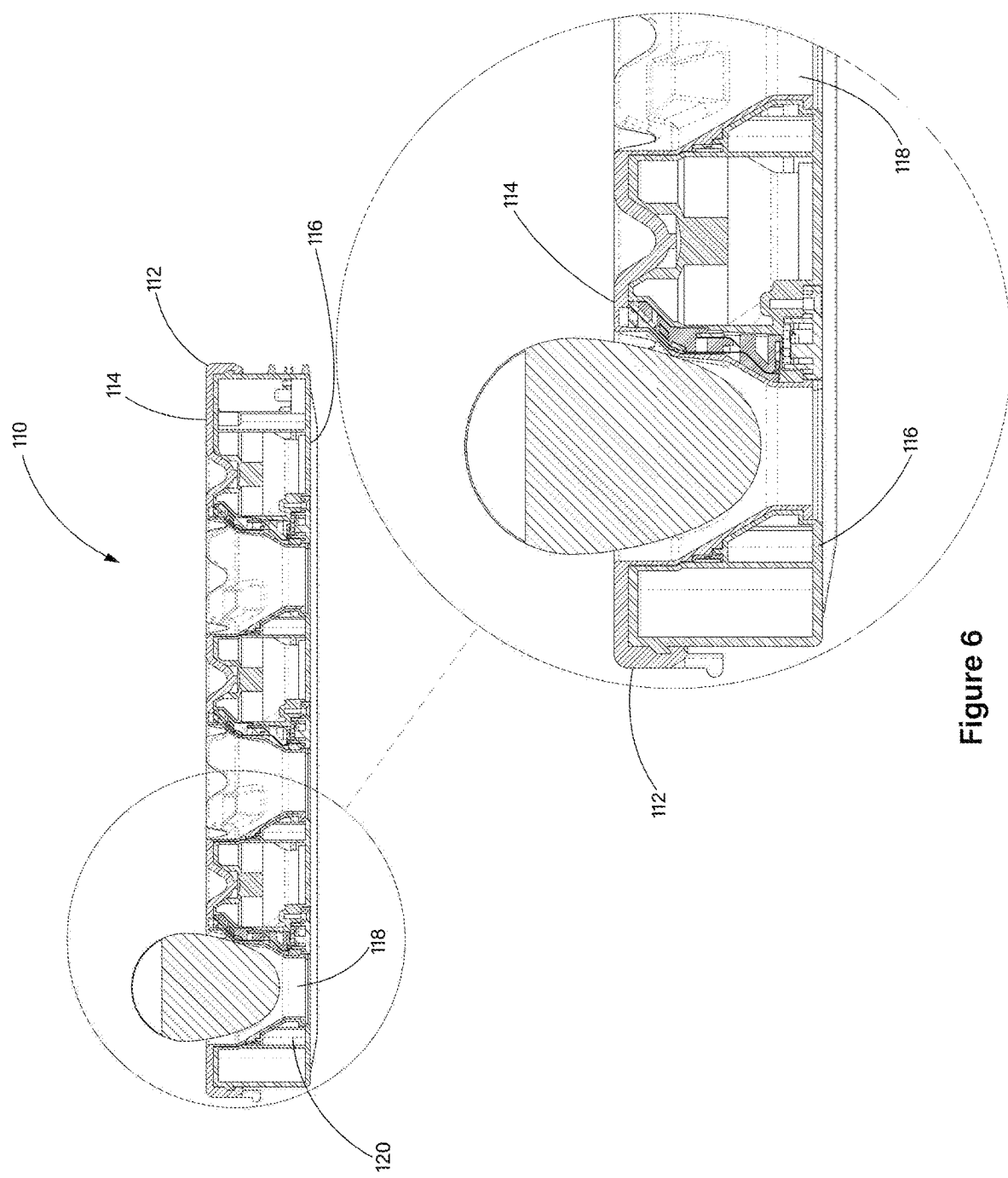
FIG. 6 is a cross-sectional side view of the incubator tray in FIG. 5 along line A-A.
Figure 7:
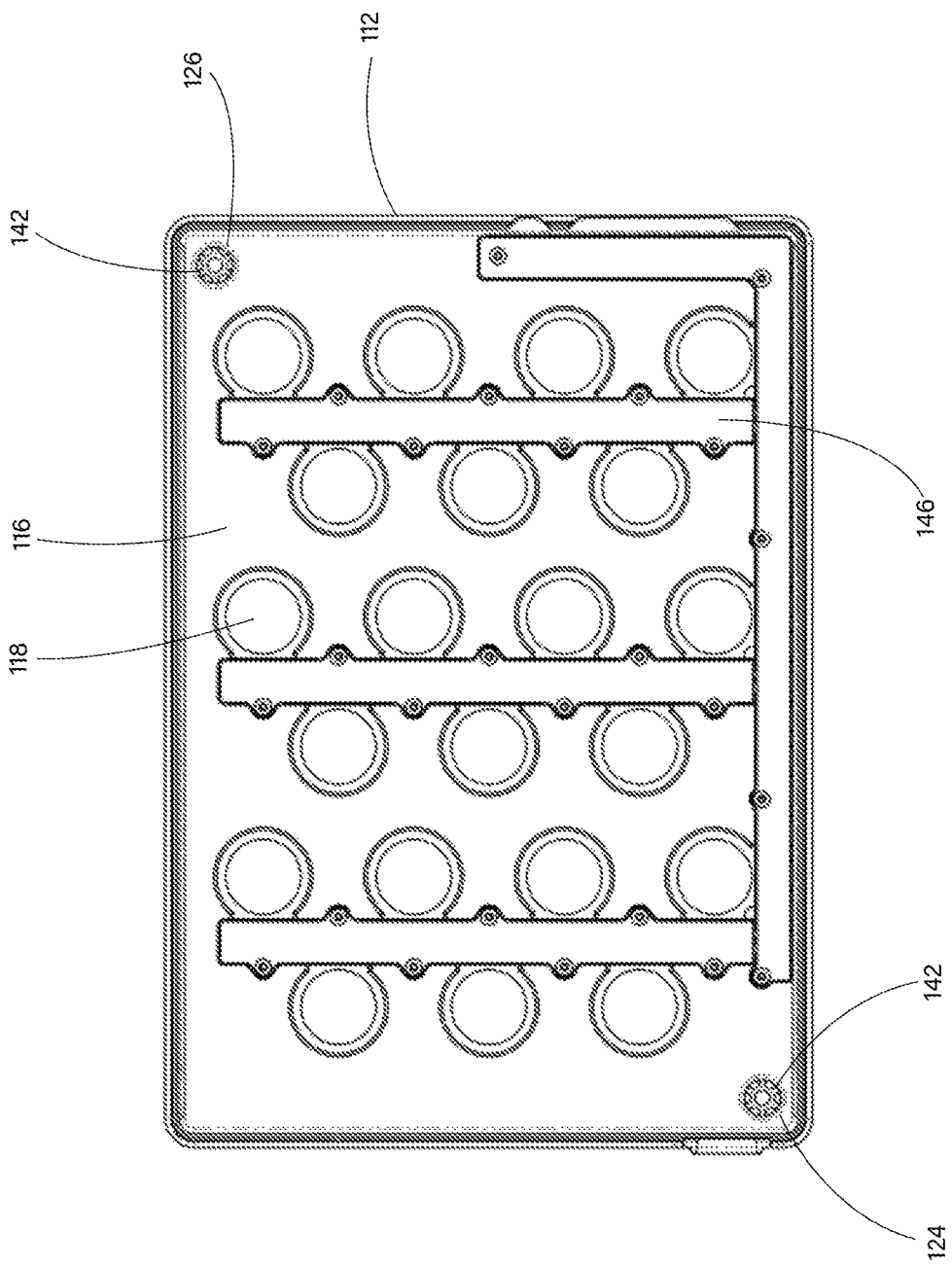
FIG. 7 is a bottom view of the incubator tray in FIG. 5.

FIGS. 5 to 7 show an alternative embodiment of an incubator tray 110, which comprises:
a body 112 that defines a first surface 114 and a second surface 116 and a plurality of bores 118 extending between the first and second surface 114 and 116;
a sonic (whether audible or not), magnetic, electrostatic or electromagnetic transmitter 140 for transmitting waves to an object (e.g. an egg) supported on the body 112, within a bore 118.

The transmitter 140 is in the form of a flexible circuit, preferably with a plurality of resistors, which flexible circuit is in the form of a loop that extends about the radial perimeter of the bore 118. In use, the transmitter 140 may be used to heat the object supported on the body 112.

FIG. 7 also shows a diffuser 142 associated with each of the incubator tray 110 inlet 124 and outlet 126, which diffuser 142 diffuses fluid that is entering and exiting the void 120 defined between the first and second surfaces 114 and 116 of the body 112. Typically, the void 120 defined between the first and second surfaces 114 and 116 of the body 112 is designed with inlet and exit manifolds and other formations to distribute fluid flow evenly through the void 120.

Furthermore, a cover 144 overlies the first surface 114 of the body 112, the bore 118 and the flexible circuits of the transmitter 140.

The incubator tray 10 and 110 may further include a processor (not shown) that is in communication with the temperature sensors 30, heart rate sensors 32, movement sensors 34, carbon dioxide sensor 36 and/or transmitter 140. FIG. 5 shows PCB strips 146 that electronically connect the temperature sensors 30, heart rate sensors 32, movement sensors 34, carbon dioxide sensor 36 and/or transmitter 140. The processor may, in turn be in communication (whether wired or wireless) with a primary controller.

The invention further extends to a method of incubating eggs on an incubator tray 10, which method includes the steps of:
  Orienting the incubator tray 10 with the first surface 14 of the body 12 operatively above the second surface 16 of the body 12.
  Supporting an egg (not shown in FIGS. 1 to 4, but shown in FIGS. 5 and 6) on the incubator tray 10, within each of the bores 18.
  Passing air over the first and second surfaces 14 and 16 of the body 12. It will be appreciated that, since the unobstructed surface area of the opening at the first axial end 18a of the bore 18 is less than the surface area of the second axial end 18b of the bore 18, airflow over the first and second surfaces 14 and 16 of the body 12 induces a pressure differential along the bore 18, which pressure differential induces flow of air along the bore from the first axial end 18a of the bore 18 to the second axial end 18b of the bore. The flow of air that causes this pressure differential along the bores 18 is typically called a venturi effect. Such air flow along the bore 18 removes carbon dioxide, humidity and heat from around the egg.
  Regulating the temperature of the incubator tray 10 by:
    monitoring the temperature of the egg using the temperature sensor 26; and
    adjusting the flow of fluid within the void 20 defined between the first and second surfaces 14 and 16 of the body 12 via the inlet and outlet 24 and 26;
  Passing air over the first surface 14 of the body 12 and over the eggs and permitting air to pass along the annular gaps between the radial walls of the bores 18 and the eggs supported therein.
  In respect of each bore 18 and its associated egg, monitoring:
    temperature of the egg using the temperature sensor 30;
    heart rate within the egg using the heart rate sensor 32;
    movement within the egg using the movement sensor 34; and
    the carbon dioxide level proximal the surface of the egg using the carbon dioxide sensor 36.
  In respect of each bore 18 and its associated egg, triggering an event should any two or more of the following conditions be met:
    the temperature sensor 30 senses the egg temperature outside of a predetermined temperature range;
    the heart rate sensor 32 senses a heart rate within the egg outside of a predetermined heart rate range; and
    the movement sensor 34 senses movement within the egg outside of a predetermined range of activity level.
  The event triggered could include any one or more of:
    communicating an alert that the embryo within the egg is dead, which signal may be communicated to a remote device;
    ceasing electricity supply to sensors 30, 32, 34 and 36 associated with the egg;
    varying the temperature of the incubator tray 10 by adjusting fluid flow within the void 20 defined between the first and second surfaces 14 and 16 of the body 12 via the inlet and outlet 24 and 26;
    varying airflow over the first surface 14 of the body 12; and
    varying the output of the heating element 38 associated with the bore 18 within which the egg is supported.
  Feedback from the carbon dioxide sensor 36 exclusively may also be used to regulate airflow over the incubator tray 10 and over the eggs.

It will be appreciated that air ventilation around the egg is facilitated by: the through-bores 18 that are open at both axial ends; and the protrusions 28 associated with each bore 18. Furthermore, it will be appreciated that the protrusions 28 ensure close contact/proximity between the sensors on the incubator tray 12 and the eggs supported on the body 12, within the bores 18.

The invention claimed is:

1. An incubator tray includes a body that defines:
   a first surface and a second surface that defines a sealed void therebetween;
   an inlet that permits fluid communication into the void defined between the first and second surfaces of the body;
   an outlet that permits fluid communication from the void defined between the first and second surfaces of the body;
   a plurality of bores that extend between the first and second surfaces, through the void defined between the first and second surfaces, wherein:
     each bore is open at both axial ends; and
     a first axial end of the bore proximal the first surface is larger in cross-sectional area than the cross-sectional area of a second axial end of the bore proximal the second surface; and
   a temperature sensor associated with each bore,
   such that an object to be incubated that is:
     undersized relative to the cross-sectional area of the first axial end of a bore; and
     oversized relative to the cross-sectional area of the second axial end of the bore, is supportable on the body, within the bore, with the open axial ends of the bore permitting ventilation through the bore, past the object.

2. The incubator tray according to claim 1, wherein, in respect of each bore, the body defines at least three protrusions that are spaced from each other and that protrude radially into the bore, such that an object supported on the body, within the bore, is supported on the protrusions associated with the bore.

3. The incubator tray according to claim 2, wherein, each protrusion extends along at least a portion of a length of the bore.

4. The incubator tray according to claim 3, wherein, in respect of each bore, the temperature sensor is disposed on a protrusion.

5. The incubator tray according to claim 4, further including:
- a heart rate sensor;
- a movement sensor;
- a carbon dioxide sensor; and
- a sonic, magnetic, electrostatic or electromagnetic transmitter for transmitting waves to an object supported on the body, within a bore, associated with each bore.

6. The incubator tray according to claim 5, wherein, in respect of each bore, the heart rate sensor, movement sensor and carbon dioxide sensor are disposed within a protrusion.

7. The incubator tray according to claim 6, wherein a heating element is associated with each bore, which heating element is controlled by the temperature sensor associated with the associated bore.

8. The incubator tray according to claim 7, wherein the heating element comprises a flexible circuit including a plurality of resistors.

9. The incubator tray according to claim 8, wherein the flexible circuit is in the form of a loop that extends about the radial perimeter of the bore.

10. The incubator tray according to claim 9, further including a processor that is in communication with each flexible circuit within the tray.

11. The incubator tray according to claim 10, wherein an egg is supported within each bore and a blanket is laid over the eggs.

12. The incubator tray according to claim 11, further including a diffuser associated with each of the inlet and the outlet to diffuse fluid that is entering and exiting the void defined between the first and second surfaces of the body.

13. The incubator tray according to claim 12, further including a cover that covers: the first surface of the body, the bore and the flexible circuits.

14. A method of incubating eggs on an incubator tray described in claim 7, which method includes the steps of:
orienting the incubator tray with the first surface of the body operatively above the second surface of the body;
supporting an egg on the incubator tray, within a bore;
passing air over the first and second surfaces of the body;
regulating the temperature of the incubator tray by:
monitoring the temperature of the egg using the temperature sensor; and
adjusting the flow of fluid within the void defined between the first and second surfaces of the body via the inlet and outlet;
monitoring:
the temperature of the egg using the temperature sensor;
the heart rate within the egg using the heart rate sensor;
movement within the egg using the movement sensor; and
the carbon dioxide level proximal the surface of the egg using the carbon dioxide sensor; and
in respect of each egg, triggering an event should any two or more of the following conditions be met:
the temperature sensor senses the egg temperature outside of a predetermined temperature range;
the heart rate sensor senses a heart rate within the egg outside of a predetermined heart rate range; and
the movement sensor senses movement within the egg outside of a predetermined range of activity level.

15. The method of incubating eggs according to claim 14 further including the step of passing air over the first surface of the body.

16. The method of incubating eggs according to claim 15, wherein the trigger event includes one or more of:
communicating an alert that the embryo within the egg is dead;
ceasing electricity supply to sensors associated with the egg;
varying the temperature of the incubator tray;
varying airflow over the first surface of the body; and
varying the power output of the heating element associated with the bore in which the egg is supported.

* * * * *